Patented Nov. 13, 1923.

1,474,133

UNITED STATES PATENT OFFICE.

WILLIAM H. ALLEN, OF DETROIT, MICHIGAN.

POLISH FOR ENAMELED SURFACES.

No Drawing.   Application filed August 10, 1922.   Serial No. 581,025.

*To all whom it may concern:*

Be it known that I, WILLIAM H. ALLEN, a citizen of the United States, and residing at Detroit, in the county of Wayne and State of Michigan, have invented a new and improved Polish for Enameled Surfaces, of which the following is a specification.

This invention consists of a liquid for cleaning and polishing the surfaces of enameled and varnish adhering to articles of iron and steel and at the same time changing the rust on such areas as have lost their coating and have been attacked by the elements to a protecting substance. Liquid preparations for cleaning and polishing surfaces of enamel and varnish usually embody vegetable or mineral oils or waxes and sometimes acidulated acid solutions some of which carry basic chloride of antimony. Solutions of acetic acid and hydrochloric acid are often embodied in these preparations.

Where the surfaces have lost their coatings of enamel or varnish, the bare metal becomes thoroughly cleaned by these acidulous solutions and they rust almost immediately after such preparations are applied.

The present invention consists in a fatty substance such as a wax, grease or an oil, either vegetable or mineral, emulsified with a solution of saponin, a glucocide found in quillaia (soap-bark), to clean and polish the varnish or enamel, and a solution of phosphoric acid to change the rust and the metallic iron of the bare surface to a phosphate of iron which is substantially rust proof. The solution of phosphoric acid has practically no effect on the varnish or enamel as it is rubbed off soon after being applied, and the emulsified oil has no effect on the bare metal and retards the action of the acid on the rust to only a limited extent. A further action of the acid is to retard or prevent the extension of the rusting under the coatings on the metal surfaces and so retards the chipping off of the enamel or varnish.

The proportions of the several materials may vary through quite wide limits but I prefer to take one part of quillaia bark and make a decoction with ten parts of water. After straining, twenty parts of animal, mineral or vegetable oil, wax or grease are added and the whole agitated until the fatty substances are emulsified, when ten parts of fifty per cent phosphoric acid and one part of sodium dihydrogen phosphate are added. Water is then added to bring the whole to one hundred parts. Any other desirable hygroscopic substance such as glycerine or glucose, which has no effect on the enamel or varnish, may be substituted for the sodium dihydrogen phosphate.

The liquid compound may be applied with a brush, sponge or swab and after a short time, the excess may be rubbed off in the usual manner. The rusty surfaces acquire and hold, through their capillarity, some of the acid aqueous solution which gradually changes the rust into dark green phosphate of iron and changes the surface of the metal underneath to rust resisting phosphates. As this liquid is to be applied frequently to keep up the polish of the enameled surfaces, the resultant action on the bare metal and rusted parts is cumulative to convert these surfaces to the rust-proof phosphates of iron.

This compound is admirably adapted for refinishing the outer surfaces of automobiles, launches, enameled advertising signs and other structures exposed to the weather and to abrasion.

I claim:—

1. A liquid compound for cleaning enameled and varnished surfaces of iron and steel, which consists of an emulsified fatty substance and a solution of phosphoric acid.

2. A liquid compound for cleaning surfaces of iron and steel which are coated in part with enamel or varnish, which consists of an emulsified fatty substance, a solution of phosphoric acid and a hygroscopic material having no effect on enamel or varnish.

3. A liquid compound for cleaning surfaces of iron and steel which are coated in part with enamel or varnish which consists of a fatty substance emulsified with a decoction of quillaia bark and an aqueous solution of phosphoric acid and sodium dihydrogen phosphate.

4. A liquid compound for cleaning surfaces of iron and steel which are coated in part with enamel or varnish which consists of a decoction of ten parts of water and one part of quillaia bark, twenty parts of fatty substance emulsified by this decoction and mixed with a solution of ten parts of fifty per cent phosphoric acid and one part of sodium dihydrogen phosphate, and sufficient water to make one hundred parts.

WILLIAM H. ALLEN.